United States Patent
Holopainen et al.

(10) Patent No.: US 11,960,617 B2
(45) Date of Patent: Apr. 16, 2024

(54) HARDWARE PROTECTION OF FILES IN AN INTEGRATED-CIRCUIT DEVICE

(71) Applicant: Nordic Semiconductor ASA, Trondheim (NO)

(72) Inventors: Jouko Holopainen, Trondheim (NO); Marko Winblad, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 671 days.

(21) Appl. No.: 17/255,367

(22) PCT Filed: Jun. 26, 2019

(86) PCT No.: PCT/EP2019/067073
§ 371 (c)(1),
(2) Date: Dec. 22, 2020

(87) PCT Pub. No.: WO2020/002468
PCT Pub. Date: Jan. 2, 2020

(65) Prior Publication Data
US 2021/0264048 A1    Aug. 26, 2021

(30) Foreign Application Priority Data
Jun. 27, 2018 (GB) ...................... 1810533

(51) Int. Cl.
*G06F 21/62* (2013.01)
*G06F 13/16* (2006.01)

(52) U.S. Cl.
CPC .......... *G06F 21/6218* (2013.01); *G06F 13/16* (2013.01); *G06F 2213/40* (2013.01)

(58) Field of Classification Search
CPC .. G06F 21/6218; G06F 13/16; G06F 2213/40; G06F 12/0246
See application file for complete search history.

(56) References Cited

U.S. PATENT DOCUMENTS

2006/0089987 A1* 4/2006 Igarashi ................. H04L 67/02
709/225
2008/0140946 A1* 6/2008 Davis .................... G06F 12/145
711/E12.001
(Continued)

FOREIGN PATENT DOCUMENTS

| CN | 106 845 273 A | * | 6/2017 |
| CN | 106845273 A | | 6/2017 |
| GB | 2503470 A | | 1/2014 |

OTHER PUBLICATIONS

EPO Official Letter for EP 19 737 481.2-1203, dated Nov. 10, 2021, 5 pages.
(Continued)

*Primary Examiner* — Khoi V Le
(74) *Attorney, Agent, or Firm* — Klarquist Sparkman, LLP

(57) ABSTRACT

A method for the protection of files is performed on an integrated-circuit device that comprises a hardware memory protection module, which controls access to regions of the memory depending on region-specific settings. A new file is created in the memory by storing metadata and content data for the new file in a common memory region. An access condition is set for the common memory region in the configuration settings of the hardware memory protection module. A file is retrieved from the memory by searching the memory to identify a file meeting a search criterion. The searching involves comparing the metadata of files from the memory against the search criterion in order to identify a file from the memory that meets the search criterion.

16 Claims, 4 Drawing Sheets

(56) References Cited

U.S. PATENT DOCUMENTS

| | | |
|---|---|---|
| 2009/0100115 A1 | 4/2009 | Park et al. |
| 2009/0113141 A1 | 4/2009 | Bullman et al. |
| 2009/0210644 A1 | 8/2009 | Batifoulier et al. |
| 2010/0199108 A1 | 8/2010 | Abzarian et al. |
| 2010/0306175 A1 | 12/2010 | Johnson et al. |
| 2013/0275769 A1 | 10/2013 | Khosravi et al. |
| 2016/0239235 A1* | 8/2016 | Chung .................... G11C 7/04 |
| 2016/0299720 A1 | 10/2016 | Berntsen et al. |
| 2018/0121125 A1 | 5/2018 | Zeng et al. |

OTHER PUBLICATIONS

International Search Report and Written Opinion for PCT/EP2019/067073, dated Oct. 17, 2019.

IPO Search Report under Section 17(5) for GB1810533.8, dated Jan. 22, 2019, 3 pages.

Search Report for Norwegian Patent Application No. 20180907, dated Jan. 10, 2019, 2 pages.

* cited by examiner

HARDWARE PROTECTION OF FILES IN AN INTEGRATED-CIRCUIT DEVICE

CROSS REFERENCE TO RELATED APPLICATIONS

This is the U.S. National Stage of International Application No. PCT/EP2019/067073, filed Jun. 26, 2019, which was published in English under PCT Article 21(2), which in turn claims the benefit of Great Britain Application No. 1810533.8, filed Jun. 27, 2018.

BACKGROUND OF THE INVENTION

This invention relates to the hardware protection of files in an integrated-circuit device.

Computing devices are sometimes required to store files that should not be overwritten or modified by unauthorised parties. Such files may, for example, contain configuration settings, boot sector files, operating system files, cryptographic keys, and so on. Preventing unauthorised writes to particular files can avoid the inadvertent or malicious corruption of data stored in these files.

In addition to write protection, read access to certain files is sometimes restricted. A computing device may store sensitive or confidential files in memory which should not be read without authorisation. This may include, for example, data containing trade secrets; or it may be files containing private keys or passwords.

Typically files are organised in a file system, such as FAT or ext*, that uses index tables, directory tables and/or inodes to hold metadata about each file in the file system. Metadata may, for example, include a filename, file size, date of creation, date of last modification, access permissions and file type. Access permission data may include whether the file is read-only or hidden. File type may for example specify that a file is a text file, or an executable file. Files are sometimes grouped in directories, which may have one or more subdirectories.

Some computers protect files by means of software techniques such as cryptography. Trying to protect files through software measures alone is not particularly secure, and is vulnerable to hacking and to software bugs. Further, cryptographic techniques may help to detect changes to a file, but cannot easily be used to prevent changes to a file.

Providing a hardware mechanism to protect files is generally regarded as more secure than software techniques. While hardware protection for file systems is known on complex devices, such as personal computers and servers, the applicant has recognised that known solutions are not always appropriate for relatively simple integrated-circuit devices, such as a system-on-chip (SoC) device, where circuit complexity, storage space, and processing resources are typically constrained.

The present invention therefore seeks to provide novel hardware mechanisms that are suitable for protecting files on integrated-circuit devices.

SUMMARY OF THE INVENTION

From a first aspect, the invention provides a method for the protection of files, performed on an integrated-circuit device, the integrated-circuit device comprising:
a processor;
a memory;
a hardware memory protection module configured to control access to a plurality of regions of the memory in dependence on respective region-specific configuration settings; and
a bus system, to which the processor and the hardware memory protection module are connected;
wherein the method comprises:
creating a new file in the memory by storing metadata for the new file and content data for the new file in a common memory region of said plurality of memory regions;
setting an access condition for the common memory region in the configuration settings of the hardware memory protection module; and
retrieving a file from the memory by searching the memory to identify a file meeting a search criterion, the searching comprising reading the metadata of a set of one or more files from the memory and comparing the metadata against the search criterion to identify a file from the set that meets the search criterion.

From a second aspect, the invention provides an integrated-circuit device comprising:
a processor;
memory;
a hardware memory protection module configured to control access to a plurality of regions of the memory in dependence on respective region-specific configuration settings; and
a bus system, to which the processor and the hardware memory protection module are connected;
wherein:
the memory stores file creation software, which, when executed on the processor, causes the processor to:
create, in the memory, a new file by storing metadata for the new file and content data for the new file in a common memory region of said plurality of memory regions; and
set an access condition for the common memory region in the configuration settings of the hardware memory protection module; and
the memory stores file retrieval software, which, when executed on the processor, causes the processor to search the memory to identify a file meeting a search criterion by reading the metadata of a set of one or more files from the memory and comparing the metadata against the search criterion to identify a file from the set that meets the search criterion.

From a third aspect, the invention provides an integrated-circuit device comprising:
a processor;
a memory;
a hardware memory protection module configured to control access to a plurality of regions of the memory in dependence on respective region-specific configuration settings; and
a bus system, to which the processor and the hardware memory protection module are connected;
wherein:
the memory stores a file comprising metadata and content data, wherein the metadata and the content data are stored in a common memory region, and wherein the configuration settings specify an access condition for the common memory region; and
the memory stores file retrieval software, which, when executed on the processor, causes the processor to search the memory to identify a file meeting a search criterion by reading the metadata of a set of one or more files from the memory and comparing the metadata against the search criterion to identify a file from the set that meets the search criterion.

Thus, it will be seen that, in accordance with the invention, both the metadata of a file and the content data of the file are stored in a common memory region which is protectable by hardware. The protection is achieved by a hardware memory protection module which can be configured to deny subsequent, unauthorised, write and/or read access to the file by setting an appropriate access condition on a memory region containing the file.

The common memory region may contain the metadata and all the content data of the file, or the file may comprise additional content data stored in one or more further memory regions of the plurality of memory regions—e.g., with the content data and the additional content data being stored across a continuous address range that spans one or more boundaries between memory regions. The searched-for file may be the new file or a different stored file. A plurality of files, each comprising respective metadata and content data, may be stored in the memory—e.g., two, ten, a hundred, or more files. The plurality of files may be stored in the same common memory region, or they may be stored across one or more different memory regions. In a preferred set of embodiments, a first file is stored in a first memory region and a second file is stored in a second memory region, different from the first memory region and protectable independently of the first memory region. For each file, at least some of the content data of the file is preferably stored in a common memory region with the metadata of the file.

The content data of a file preferably follows the metadata of the file. The content data may occupy a memory address adjacent to the metadata—e.g., the next memory address after the end of the metadata. In this way, it is not necessary to store a pointer to the content data in the memory; the content data of a file can be located simply by locating the meta data and then reading from a memory address a predetermined distance from the end (or start) of the meta data (e.g. the very next memory address).

Pairs of files may be abutting, or the files may be spaced apart. A file may, at times, contain null content data—e.g., all zero bytes, or random data, or discarded data. A file may comprise an end marker value indicating an end of the content data, or a content data region may be defined by the meta data.

Files are retrieved by searching metadata that is located in the same memory region as the content data. In this way, hardware protection of files in a file system is achieved in a way that avoids the complexity of having to protect a table of contents, containing file metadata for a plurality of files, that is stored separately from the data content of the files.

By providing protection at the level of hardware, the protection provided can be more robust than a software-only protection mechanism because it is unlikely that a third party would have the knowledge, means and equipment to circumvent the hardware protection module.

The hardware protection module may be configured to control access to each of the memory regions as a whole. For example, the configuration settings may specify that all write access to a first region of the memory is denied (i.e., an access condition that grants read access only), or may specify that read access to a second memory region is denied unless the processor (or another bus master) is in a secure state. Each memory region may consist of a range of consecutive memory addresses—i.e. each memory region may be a contiguous block of memory. A memory region may be defined by a start address and an end address, or by a start or end address and a length. The start address, and/or end address, and/or length value, may be hardwired, or may be configurable—e.g., specified in the configuration settings.

In some embodiments, the processor is configured to send memory access requests over the bus system which are received (e.g., intercepted) by the hardware memory protection module. Other bus masters, such as peripherals or other processors, may also send memory access requests that are received by the hardware memory protection module.

The hardware memory protection module may be configured to control access to a plurality of regions of the memory in dependence on respective region-specific configuration settings, by:

receiving a memory access request, over the bus system, for an address in a memory region of said plurality of memory regions;

granting access to the address if the memory access request satisfies an access condition for the memory region as specified by the configuration settings; and denying access to the address if the memory access request does not satisfy the access condition for the memory region.

The memory access request may be a read request, or a write request, or an instruction-fetch request. The configuration settings may specify an access condition, for a memory region, that depends on the type of memory access request (e.g., read or write or instruction-fetch), and/or that depends on the source of the memory access request (e.g., the processor or another bus master), and/or that depends on a security state of the device (e.g., a security state of the processor, or a security state of the bus transaction). The access condition may depend on one or more additional factors, such as the current time, or whether the processor is in a kernel or user mode, etc. In some situations, an access condition for a memory region may grant all access without restriction. It is even possible that an access condition for a memory region may deny all access, although this would typically be only for a time-limited period, as otherwise it would render the region unusable. Different memory regions may have different access conditions. The access condition may be relatively complex—e.g., allowing read access, but denying write access, when the processor is in a non-secure state, and allowing read access and write access when the processor is in a secure state.

The access conditions may be encoded in any appropriate way in the configuration settings. In some embodiments, the configuration settings may be, or may comprise, an access control list. Each entry in the access control list may relate to a respective memory region, and may define an access condition for that region. The regions may be predefined (e.g., hard-wired), or each entry may define its respective region (e.g., by encoding a start address and an end address for the region).

In some embodiments, the metadata comprises a filename. The search criterion may specify, or comprise, or otherwise relate to, a filename of a searched-for file. In some embodiments, the metadata may comprise a timestamp—e.g., representing the date or time on which the file was created or edited. A timestamp or time range may be used for the search. In some embodiments, the metadata may comprise a file type. The search criterion may specify a file type. Metadata other than the examples listed here may also be stored and/or included in a search criterion.

The metadata of each file is preferably unique. The filename of each file may be unique.

Where a plurality of files meet a search criterion, searching the memory to identify a file meeting the search criterion may comprise identifying one file that meets the search criterion—e.g., the file located at a lowest address value—or it may comprise identifying two or more (e.g., all) of the plurality of files that meet the search criterion. In some embodiments, the search ends immediately after one file that meets the search criterion is identified (i.e., without searching for a second or further file). Thus, for example, in a scheme wherein the metadata searched for is the filename, any further file with the same filename as a file found in the search will not appear in the search results; it will effectively be invisible. In some embodiments, the searching of the files in protected memory regions may always be performed in the same order.

The searching may comprise reading data from memory addresses in the memory spaced at intervals from a start address value to an end address value, higher than the start address value. The intervals may be regular intervals—e.g., every byte, or every memory bus width, such that the whole memory is read between the start address and the end address. Alternatively, the intervals may be irregular intervals—e.g., using a file length value in the meta data to skip over the content data of each file. The start address may be fixed. It may define a first end of the memory. The end address may be fixed or variable. It may be fixed and define a second end of the memory. It may be variable—e.g., with the reading stopping once a matching file is identified.

The memory of the integrated-circuit device may store a kernel image of an operating system—e.g. developed by the IC-device manufacturer. The memory may store a user image—e.g., software created by a customer of this manufacturer. A file (including both metadata and content data) created by the kernel image may be stored in a first memory region. A file created by the user image may be stored in a second memory region, different from the first memory region. The first memory region may have a stricter access condition than the second memory region. Stricter here means that there is at least one type of memory access request that the hardware memory protection module would grant if it addresses the second memory region, but deny if it addresses the first memory region. For example, the second memory region may have unrestricted access, while the first memory region may be accessible only by a bus master that is in a secure state. In this way, the present scheme is able to protect core operating system files from modification whilst allowing user files to be read, overwritten, edited or deleted.

In addition to protecting searchable files, the hardware memory protection module may also be used to protect static data such as executable code, which is not stored in files. For example, the kernel image itself may be stored across one or more memory regions that have strict access conditions. A user image may be stored across one or more memory regions that may have less strict access conditions. In particular, a boot sector of a firmware or an operating system for execution by the processor may be stored in a memory region that has strict access conditions. This way, the need for a boot sector integrity check upon start-up of the integrated-circuit device may be avoided, because the boot sector is protected by the hardware.

The configuration settings may be stored in the memory or elsewhere on the device (e.g., in ROM). The memory may include configuration registers, each configuration register configurable to define the access condition of a respective memory region. The configuration settings may themselves be located in one or more memory regions that have relatively strict access conditions. The configuration settings may be writeable only when the processor is in a secure state. In this way, the settings cannot be maliciously or inadvertently changed by unauthorised code. Entering a secure state may require an authentication process.

One or more files containing cryptographic data may be protected (e.g., cryptographic key data).

The hardware memory protection module may use Arm™ Trustzone™ when controlling access to one or more regions of the memory. The hardware memory protection module may be configured to determine whether a memory access request is issued by a bus master that is in a secure state—e.g., an Arm™ Trustzone™ secure state. The bus system may communicate security state information—e.g., using a bus line that communicates a secure state flag. The bus system may be an Arm™ AMBA bus system. The bus system may support Arm™ Trustzone™ for signalling a secure state.

The memory may store software for writing the configuration settings. The software may be a firmware module or a driver. Application code may be able to set an access condition in the configuration settings by generating a system call to the software. Alternatively, application code may be able to write directly to a hardware register of the hardware memory protection module.

In a preferred set of embodiments, setting an access condition for the common memory region comprises configuring the hardware memory protection module to deny at least some memory access requests to the common memory region. The access condition may cause the hardware memory protection module to deny access to the memory region for some or all write requests. In some such embodiments, at least some read requests may be granted. In this way, a file in the memory region can be write-protected, after it has been created, thereby restricting future, unauthorised changes to the file.

The hardware protection memory module may comprise a bus snooper module for monitoring memory access requests sent over the bus system. The bus snooper module may determine information about a memory access request, such as one or more of: a request type (e.g., read, write, fetch); the identity of the bus master that generated the request; security state information; and/or a target address. This information may then be used by the hardware memory protection module to determine if the memory access request satisfies an access condition for a memory region addressed by the request.

In some embodiments, each file and its corresponding meta data are written only once. In other embodiments, an address in the content data of a file may be written to a plurality of times.

In some embodiments, a memory region may be set to be permanently read-only (at least until the next device reset). This may be accomplished by the hardware memory protection module being configured to prevent an access condition that specifies read-only access for the memory region from being modified once it has been set.

The memory may be volatile (e.g., SRAM) or non-volatile (e.g., flash) or may include a combination of both. At least some of the memory regions may be independently-erasable non-volatile memory pages—e.g., respective flash memory blocks.

In one set of embodiments, upon reset of the device, a set of configuration registers (which may be in non-volatile memory) are used to write the configuration settings (which may be in volatile memory)—e.g., by copying values from configuration registers stored in non-volatile memory to an access control list that is stored in the volatile memory. This may improve the performance of the hardware memory protection module, especially if the volatile memory (e.g., RAM) has a faster read speed than the volatile memory. This writing may be controlled by boot-loader code executed by the processor. The processor may be released from reset only after the configuration settings (e.g., an access control list) are written, based on the contents of the configuration registers.

The file creation software and/or file retrieval software may be part of a firmware module. They may be accessible to an application module stored in memory of the device via an API (application programming interface). Alternatively, they may be software routines within application code or any other software unit on the device. In some embodiments, the file retrieval software may execute with an elevated security level; this can allow it to read memory regions that may have restricted access to non-secure code. The file retrieval software may return an address to an identified file to a calling function. The calling function may potentially be executing at a lower security level than the file-retrieval software.

Features of any aspect or embodiment of the invention as described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain embodiments of the invention will now be described, by way of example only, with reference to the accompanying drawings in which.

DETAILED DESCRIPTION

Figure 1:
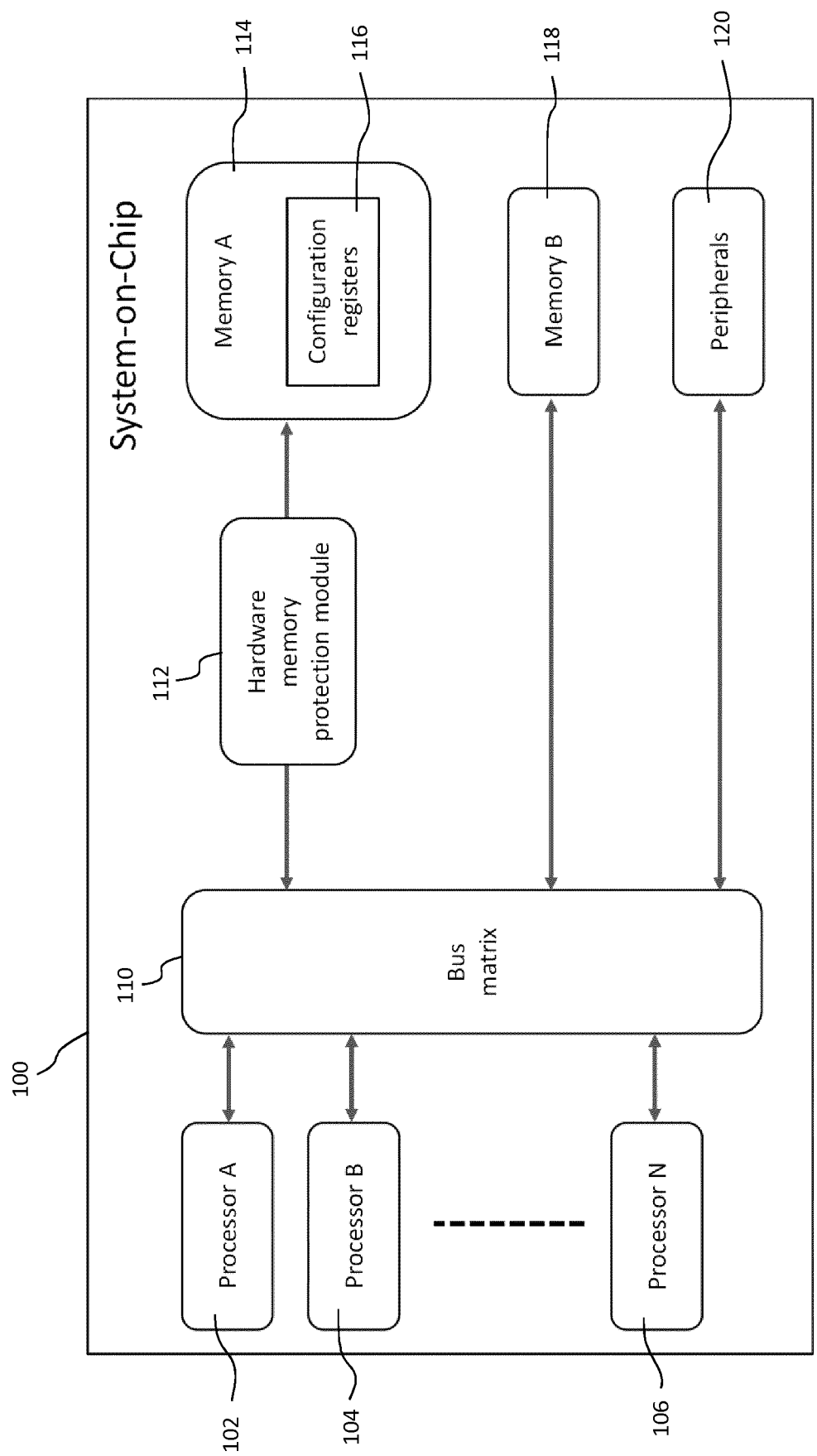
FIG. 1 illustrates an integrated-circuit system-on-chip device in accordance with an embodiment of the invention.

FIG. 1 shows an integrated-circuit system-on-chip device 100 that includes components for the hardware protection of files in accordance with an embodiment of the invention. The device 100 may be a digital radio on chip device.

The device 100 includes a plurality of processors 102-106. In other embodiments, a single processor may be used. The device 100 further comprises a flash memory 114. The flash memory 114 may inherently comprise a plurality of distinct memory areas such as separate flash pages. The flash memory 114 may store a set of configuration registers 116 containing respective access conditions for different memory regions in the flash memory 14. These memory regions may correspond to the flash pages, or they may be independent of these—e.g., defined by start and end addresses.

The device 100 also has further memory 118. This further memory 118 may be volatile or non-volatile. A set of peripherals 120 are included in the device 100 in known manner.

Arm™'s AMBA™(Advanced Microcontroller Bus Architecture) is an open interface protocol for embedded System on Chip applications. The device 100 has a bus system that implements an AMBA™ specification.

The bus system comprises a bus matrix 110 that connects the processors 102-106 with the hardware protection module 112, the further memory 118 and the peripherals 120.

Notably, the bus system is not directly connected to the flash memory 114, but is connected to the flash memory 114 via the hardware memory protection module 112. The hardware memory protection module 112 intercepts memory access requests for the flash memory 114, determines whether the access request is for a region of memory to which access is restricted by an access condition, and either grants or denies access to the memory region depending on whether the access request satisfies the relevant access condition.

Figure 2:
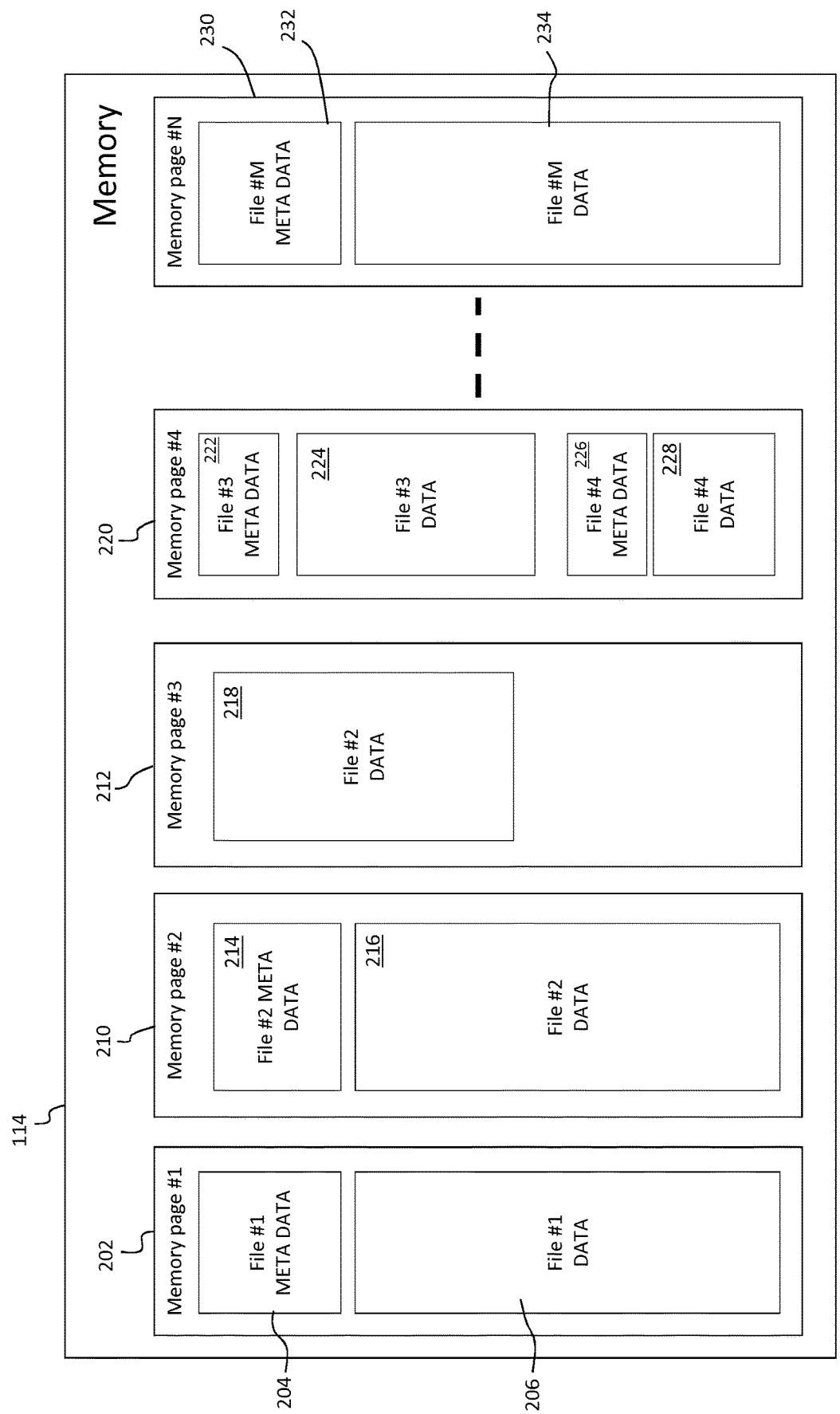
FIG. 2 illustrates a memory module within the integrated-circuit device, in accordance with an embodiment of the invention.

The structure of the memory regions of the flash memory 114 at a particular moment in time is shown in FIG. 2. The configuration registers are not shown in FIG. 2.

The memory 114 in FIG. 2 is shown as containing N memory regions. In this embodiment, the memory regions are individually-erasable flash memory pages.

Memory page #1 202 contains the content data 206 of a file—labelled File #1—together with the metadata 204 of the file.

Memory page #2 210 contains the metadata 214 of a File #2 and part 216 of the content data of File #2. Memory page #3 212 contains the rest 218 of the content data of File #2.

Memory page #4 220 contains the metadata 222 of a File #3 and the content data 224 of File #3. Memory page #4 220 also contains the metadata 226 of File #4 and the content data 228 of File #4.

Additional memory pages, up to Memory page #N 230, may each contain metadata and content data of files as described above in relation to Memory pages #1-#4.

For example, each memory page may contain:
(i) the metadata and content data of a single file, as shown in memory page #1 202; or
(ii) the metadata of a single file and only some of its content data as shown in memory page #2 210. The rest of the content data may be stored in one or more further memory pages (see memory page #3 212) contiguous with the memory page (that is, in this example, contiguous with memory page #2 210); or
(iii) the metadata and content data of multiple files, as shown in memory page #4 220.

Each memory page does not necessarily need to be fully populated, as shown in memory page #3 212.

At any moment in time, the content data of a particular file may be full of information, or may be empty (e.g., containing null or void data), or may be partially filled with information. The meta data may define the size of the content data region.

The meta data encodes the filename of the file. It can also encode the length of the file, and other information such as a creation date, or a file type.

Figure 3:
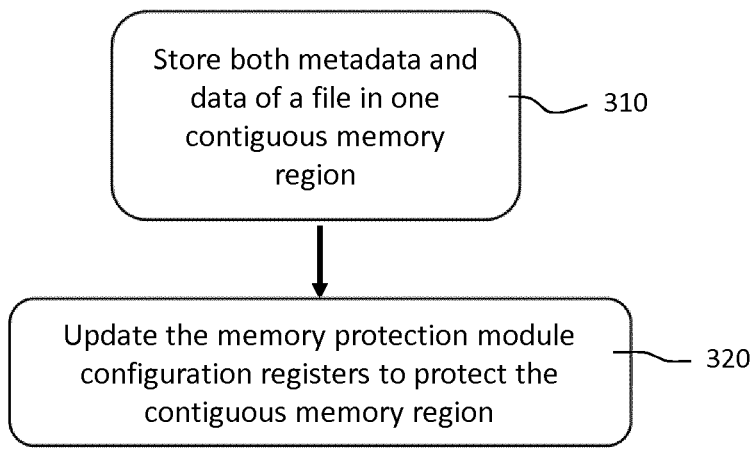
FIG. 3 is a flowchart illustrating a method of storing files in accordance with an embodiment of the invention.
Figure 4:
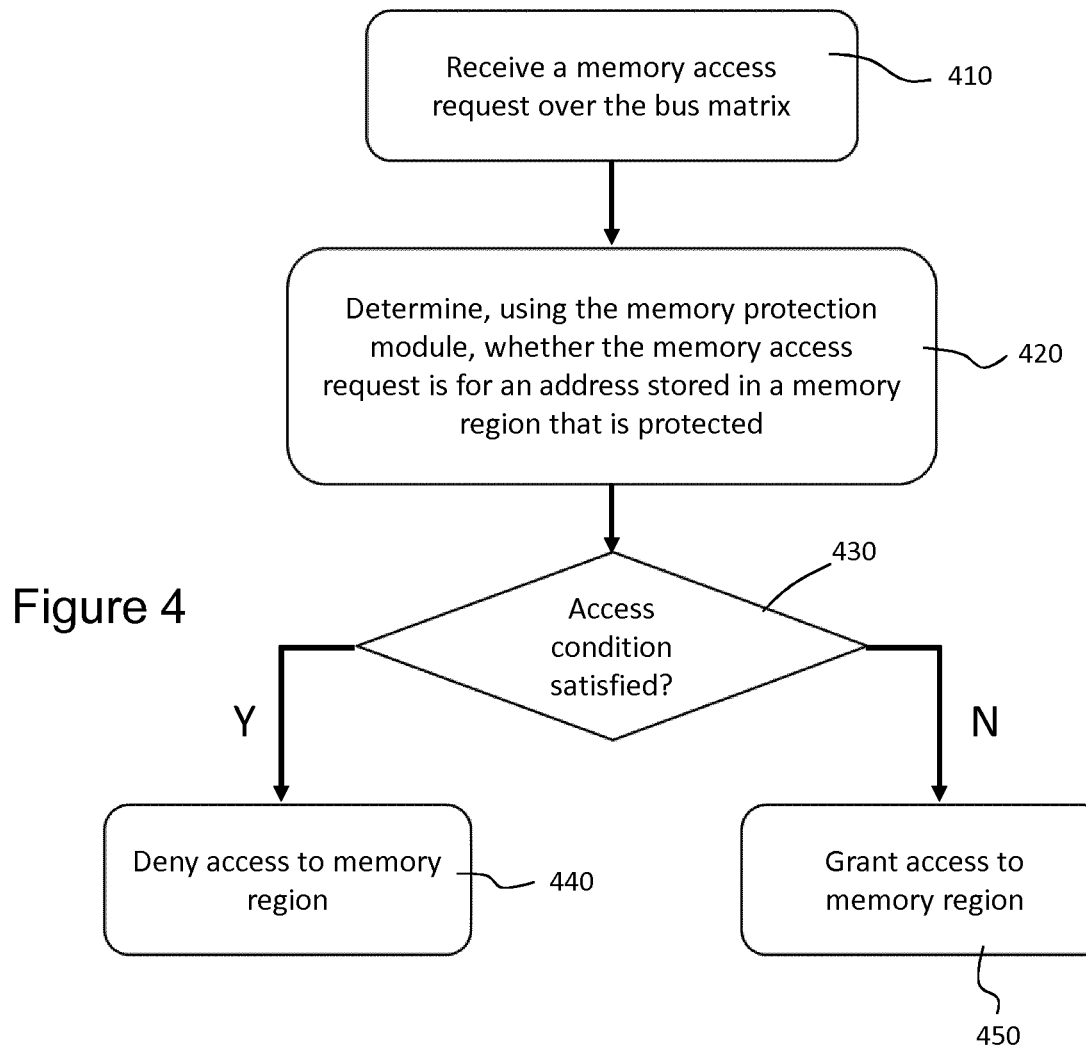
FIG. 4 is a flowchart illustrating a method of memory access in accordance with an embodiment of the invention.

The device 100 is configured to protect files using the memory 114 by means of the methods illustrated by the flowcharts of FIGS. 3 and 4.

FIG. 3 shows at step 310, file-creation software causing both the metadata and the content data of a file to be stored in one contiguous memory region (e.g., a flash memory page as illustrated in FIG. 2 and as described above). The configuration registers of the hardware memory protection module 112 are then updated in step 320 to protect this memory region by restricting access to the memory region as desired (e.g., to deny all future write access to the memory region).

FIG. 4 shows how the protection of files is subsequently enforced. First, a request to access a file is made at step 410. This request may originate from within application software executing on the processor 102. It may be received by file-retrieval software written by the chip manufacturer executing on the processor 102. The request to open a file causes the file-retrieval software to search to find the memory location of the file. This is described in more detail below.

Once the file has been located by the file-retrieval software, the application software is passed the address of the file and attempts to access the file—e.g., to read from it or to write to it. This causes the processor 102, operating with the security state of the application software, to issue a bus request for a memory address in the file.

At step 420, the hardware memory protection module 112 intercepts this bus request and determines whether it addresses a memory region that is protected by an access condition. It may make this determination by means of an access control list stored in volatile hardware registers of the hardware memory protection module 112; these registers may be populated from the flash configuration registers at boot time. The access control list contains access conditions for all the memory regions that are protected.

In some embodiments, the hardware memory protection module 112 may use Arm™ Trustzone™ secure technology to determine if a memory access request satisfies an access condition—e.g., by checking a security state of the bus request.

At step 430, if the bus request does not meet the access condition for the memory region, flow transfers to step 440 where the memory access request is denied. This denial could simply be no response to the bus transaction, or it could result in a reset of the device 100. Also at step 430, if the access condition is met, flow transfers to step 450 where the memory access request is granted.

File indexes are not used to search for and locate files. Instead in the present scheme, both the metadata and at least some of the content data of a particular file are stored in a single protectable region, and files are located by scanning through the memory 114, reading meta data from successive files until a searched-for file is identified.

Figure 5:
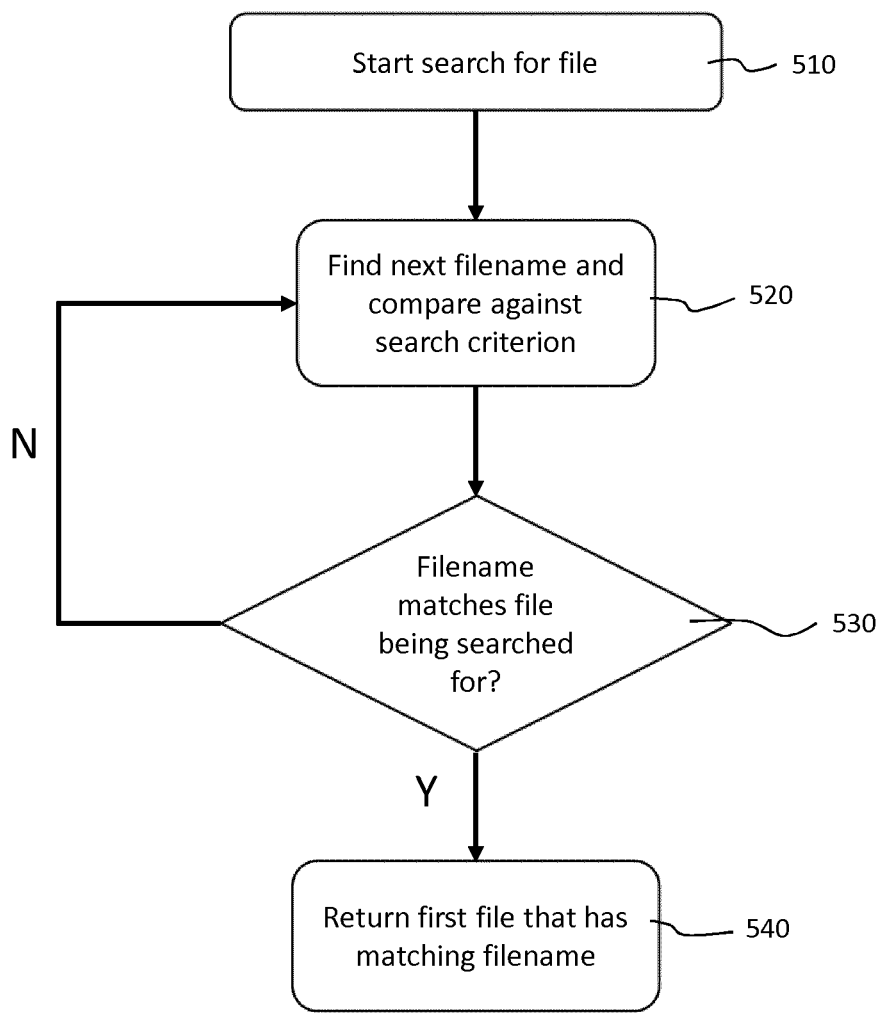
FIG. 5 is a flowchart illustrating a method of searching for files in accordance with an embodiment of the invention.

FIG. 5 shows a flowchart of steps used to search for a file that has been hardware protected in accordance with principles of the present invention.

The file search starts at step 510. The search is performed by file-retrieval software. In this example, the search criterion is a file name. This may have been received as a search parameter by the file-retrieval software from user software on the device.

At step 520, the file-retrieval software reads through addresses in the memory 114 to identify file metadata. It locates the filename of a first file stored in a first memory region. In other embodiments, other metadata may be checked and compared. At step 530, if the filename of this first file does not match the filename of the file being searched for, flow returns to step 520 where the software routine scans the memory to locate a subsequent file and checks the filename of a second file in a similar fashion. If there is no further file, the process times out and returns a file-not-found indication. The software routine continues checking the filenames of files in this sequential manner until, at step 540, it finds a file whose filename matches the filename of the file being searched for. It returns a pointer to this file.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method for the protection of files, performed on an integrated-circuit device, the integrated-circuit device comprising:
   a processor;
   a memory;
   a hardware memory protection module configured to control access to a plurality of regions of the memory in dependence on respective region-specific configuration settings; and
   a bus system, to which the processor and the hardware memory protection module are connected;
   wherein the method comprises:
      creating a new file in the memory by storing metadata for the new file and content data for the new file in a common memory region of said plurality of memory regions, wherein the metadata comprises one or more of: a filename, a timestamp, and a file type;
      setting an access condition for the common memory region in the configuration settings of the hardware memory protection module, wherein the access condition specifies a type of memory access request that is granted access to the memory region, wherein said type of memory access request is one of a read request, a write request or an instruction fetch; and
      retrieving a file from the memory by searching the memory to identify a file meeting a search criterion, wherein the search criterion specifies one or more of: a filename, a timestamp, and a file type, the searching comprising reading the metadata of a set of one or more files from the memory and comparing the metadata against the search criterion to identify a file from the set that meets the search criterion.

2. The method of claim 1, wherein the content data of the new file occupies a memory address adjacent to the metadata.

3. The method of claim 1, wherein the new file comprises additional content data stored in one or more further memory regions of the plurality of memory regions.

4. The method of claim 1, wherein:
   the memory stores a plurality of files, each comprising respective metadata and content data;
   a first file of the plurality of files is stored in a first memory region;
   a second file of the plurality of files is stored in a second memory region, different from the first memory region;
   access to the first memory region is controlled in dependence on first configuration settings; and
   access to the second memory region is controlled in dependence on second configuration settings, separate from the first configuration settings.

5. The method of claim 1, comprising the hardware memory protection module controlling access to the plurality of regions by:
   receiving a memory access request, over the bus system, for an address in a memory region of said plurality of memory regions;

determining whether the memory access request satisfies an access condition for the memory region as specified by the configuration settings;

granting access to the address if the memory access request satisfies the access condition for the memory region; and denying access to the address if the memory access request does not satisfy the access condition for the memory region.

6. The method of claim 1, wherein the memory stores a plurality of files, each comprising respective metadata and content data, wherein the metadata of each file comprises a respective filename that is unique to the respective file.

7. The method of claim 1, comprising ending the search immediately after identifying one file that meets the search criterion.

8. The method of claim 1, wherein the hardware memory protection module is configured to read the region-specific configuration settings from a volatile memory of the integrated-circuit device, the method further comprising:

upon reset of the device, writing the configuration settings to the volatile memory based on data stored in a set of configuration registers in a non-volatile memory of the device; and releasing the processor from reset only after the configuration settings are written to the volatile memory.

9. The method of claim 1, comprising setting a file in a memory region to be permanently read-only, by configuring the hardware memory protection module to prevent modification of an access condition that specifies a read-only access for said memory region.

10. An integrated-circuit device comprising:

a processor;

a memory;

a hardware memory protection module configured to control access to a plurality of regions of the memory in dependence on respective region-specific configuration settings; and a bus system, to which the processor and the hardware memory protection module are connected;

wherein the memory stores file creation software, which, when executed on the processor, causes the processor to:

create, in the memory, a new file by storing metadata for the new file and content data for the new file in a common memory region of said plurality of memory regions, wherein the metadata comprises one or more of: a filename, a timestamp, and a file type; and set an access condition for the memory region in the configuration settings of the hardware memory protection module, wherein the access condition specifies a type of memory access request that is granted access to the memory region, wherein said type of memory access request is one of a read request, a write request or an instruction fetch; and wherein the memory stores file retrieval software, which, when executed on the processor, causes the processor to search the memory to identify a file meeting a search criterion by reading the metadata of a set of one or more files from the memory and comparing the metadata against the search criterion to identify a file from the set that meets the search criterion, wherein the search criterion specifies one or more of: a file name, a timestamp, and a file type.

11. The integrated-circuit device of claim 10, wherein the content data of the new or stored file occupies a memory address adjacent to the metadata of the new or stored file.

12. The integrated-circuit device of claim 10, wherein each memory region of the plurality of memory regions is a respective independently-erasable non-volatile memory page.

13. The integrated-circuit device of claim 10, wherein the hardware memory protection module is configured to control access to the plurality of regions by:

receiving a memory access request, over the bus system, for an address in a memory region of said plurality of memory regions;

determining whether the memory access request satisfies an access condition for the memory region as specified by the configuration settings;

granting access to the address if the memory access request satisfies the access condition for the memory region; and denying access to the address if the memory access request does not satisfy the access condition for the memory region.

14. The integrated-circuit device of claim 10, wherein the file retrieval software, when executed on the processor, ends the search immediately after one file that meets the search criterion is identified.

15. The integrated-circuit device of claim 10, wherein the new or stored file contains cryptographic data.

16. An integrated-circuit device comprising:

a processor;

a memory;

a hardware memory protection module configured to control access to a plurality of regions of the memory in dependence on respective region-specific configuration settings; and a bus system, to which the processor and the hardware memory protection module are connected;

wherein:

the memory stores a file comprising metadata and content data, wherein the metadata comprises one or more of: a filename, a timestamp, and a file type, wherein the metadata and the content data are stored in a common memory region and said plurality of memory regions, and wherein the configuration settings specify an access condition for the common memory region, wherein the access condition specifies a type of memory access request that is granted access to the memory region, wherein said type of memory access request is one of a read request, a write request or an instruction fetch; and the memory stores file retrieval software, which, when executed on the processor, causes the processor to search the memory to identify a file meeting a search criterion by reading the metadata of a set of one or more files from the memory and comparing the metadata against the search criterion to identify a file from the set that meets the search criterion, wherein the search criterion specifies one or more of: a filename, a timestamp, and a file type.

* * * * *